July 30, 1935.  J. C. HANNA ET AL  2,009,616
VALVE STRUCTURE
Filed June 2, 1933  2 Sheets-Sheet 1
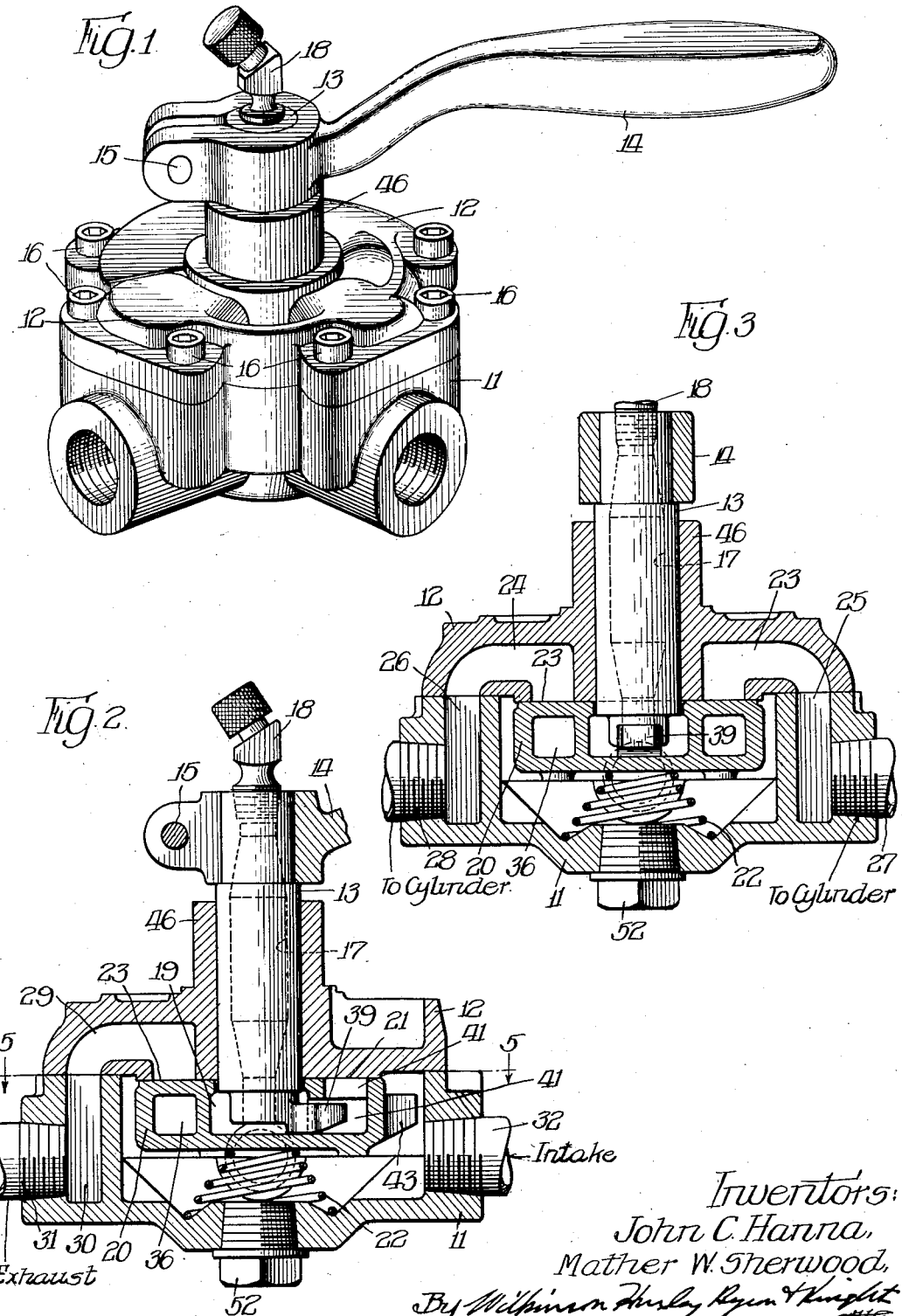

July 30, 1935.  J. C. HANNA ET AL  2,009,616
VALVE STRUCTURE
Filed June 2, 1933    2 Sheets-Sheet 2
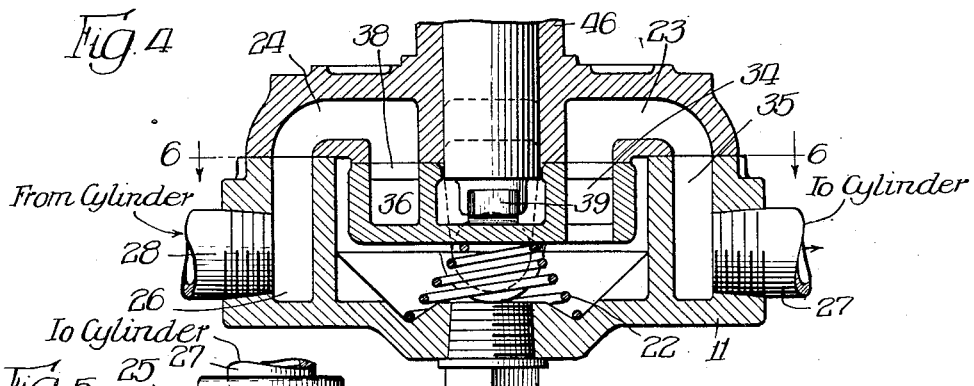
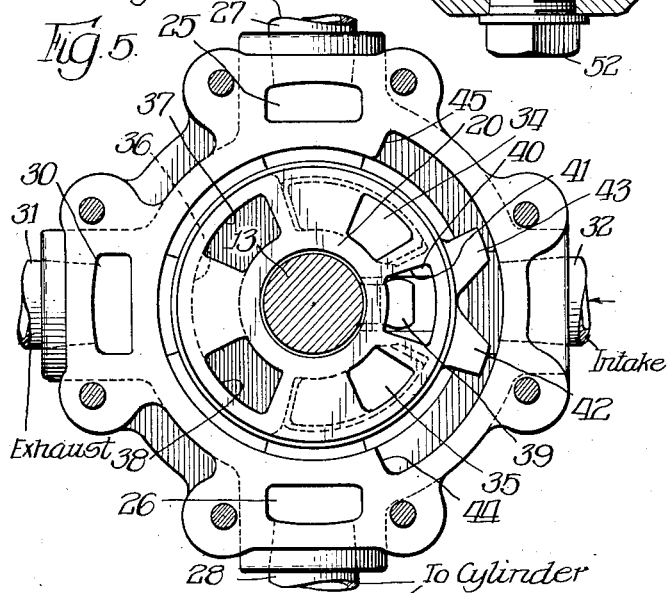
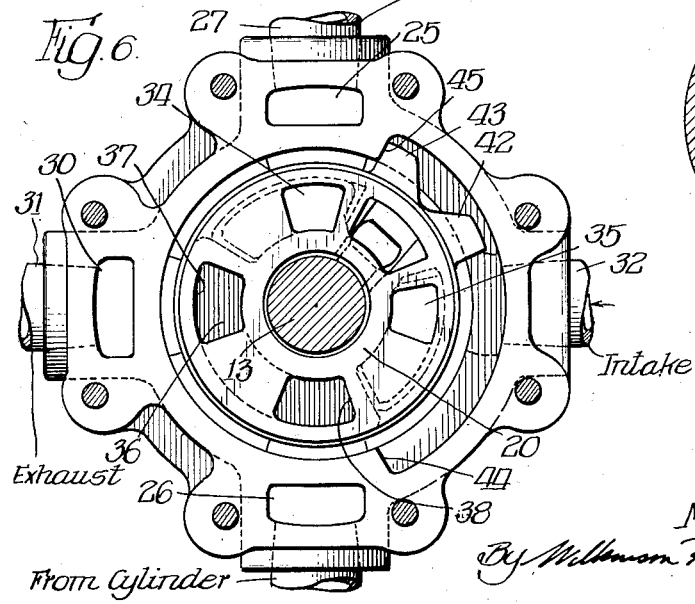
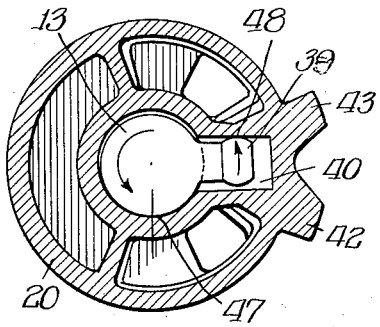
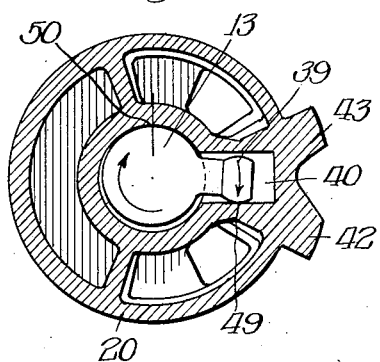
Inventors:
John C. Hanna,
Mather W. Sherwood, Patented July 30, 1935

2,009,616

UNITED STATES PATENT OFFICE 2,009,616

VALVE STRUCTURE

John C. Hanna and Mather W. Sherwood, Chicago, Ill., assignors to Hanna Engineering Works, Chicago, Ill., a corporation of Illinois Application June 2, 1933, Serial No. 673,984

14 Claims. (Cl. 251—90)

This invention relates to a new and improved valve structure, and more particularly to a valve for controlling the flow of fluid under pressure, such, for example, as compressed air.

Valves of this character are used in controlling the power cylinders of apparatus such as hoists, presses, punches, riveters, or other forms of apparatus operated by compressed air. These valves are designed to control a plurality of openings and are often used to simultaneously control separate flows in opposite directions, as, for example, to the intake side of a cylinder piston and from the discharge side of the piston.

Such valves, as generally constructed, comprise a rotatable disc having openings and passages therein which may be moved into and out of registration with selected openings by means of rotation of the disc. It has been found in such types of construction where the disc is rotated about a fixed axis, wear takes place and clearly defined circular grooves develop in both the valve face of the disc and in its associated seating face. Some of these grooves are the result of minute irregularities in the materials or lack of uniformity in hardness or homogeneity of structure. Other grooves are caused by foreign matter which may work between the surfaces, being carried into the valve structure by the fluid being controlled. Both types of grooves are undesirable and are clearly visible to the naked eye after operation of a valve of this type for any reasonable period. In the case of grooves due to the lack of uniformity of the material of the valve a circular ridge on one surface will be found fitting into a similar circular groove in the other surface. The type of grooves resulting from foreign particles will consist in matching grooves on the two opposed surfaces. The foreign particles will not be ejected until the grooves reach a port in the valve disc or valve seat whereupon leakage lines or passages have been formed.

Another difficulty in prior valve structures of this type has been to secure adequate lubrication between the valve disc and valve seating surfaces. In the usual type of valve the valve surface is so interrupted that the entire surface of the valve and seat is not wiped in normal valve operation. In usual types of valves the valve disc is held against its seat by the line pressure of air entering the valve body through the valve intake port. Where the valve surface is not symmetrical about its axis the pressure varies on different contact faces, as, for example, where a wide exhaust opening is formed in the valve. Such pressure differences result in differential wear of the contacting surfaces at different points on the valve disc. This unequal wear ultimately causes leakages and pressure losses.

It is an object of the present invention to provide a new and improved valve construction.

It is a further object to provide a construction in which wear of the valve surfaces is reduced and formation of circular grooves or ridges prevented.

It is also an object to provide a construction in which the valve surfaces are directly lubricated.

It is an additional object to provide a construction in which the contact surfaces between the valve and valve seat are substantially balanced in area about the axis of movement of the valve.

It is a further object to provide a construction which is simple in design and in assembly, and adapted for commercial production and use.

Other and further objects will appear as the description proceeds.

We have shown a preferred embodiment of our invention in the accompanying drawings, in which—

Figure 1 is a perspective view of the valve assembly;

Figure 2 is a vertical section taken through the exhaust and intake connections;

Figure 3 is a vertical section taken at right angles to Figure 2 and passing through the cylinder connections, which connections are closed;

Figure 4 is a view generally similar to Figure 3 but showing the valve member turned to open the connections to the cylinders;

Figure 5 is a view taken on line 5—5 of Figure 2;

Figure 6 is a view taken on line 6—6 of Figure 4; and

Figures 7 and 8 are fragmentary views of the valve disc in horizontal section, showing the relation of the valve operating member to the valve disc upon movement in each direction.

In the drawings, the valve assembly as shown in Figure 1, comprises the valve body 11, the valve cover 12, the valve stem or operating member 13, and valve operating handle 14. The handle 14 is shown as clamped to the stem 13 by the bolt 15. The valve cover 12 is secured to the valve body 11 by means of a plurality of bolts 16.

As shown in Figures 2 and 3, the valve stem 13 is provided with a longitudinally extending central cavity as indicated at 17, and the upper end of this cavity is connected to a fitting 18 for the purpose of introducing a lubricant into the stem. The lower end of the central passage 17 communicates with the pocket 19 formed in the valve disc 20. The valve disc 20 is held against the valve seat 21 in the valve cover 12 by means of the coil spring 22 which rests on the bottom of the inside of the valve body 11.

The valve cover 12 is provided with passages 23 and 24 which communicate with passages 25 and 26 respectively, formed in the valve body 11. These passages 25 and 26 have threaded openings into which are secured pipes 27 and 28 which may be connected to opposite ends of a piston cylinder to be controlled by the valve. As shown in Figure 2 the valve cover 12 is also provided with the passage 29 communicating with the passage 30 formed in the valve body 11, this passage 30 having a lateral opening into which is threaded a pipe 31, which may serve as an exhaust pipe and be connected to any desired point where it is desired to discharge exhaust air. The valve body 11 is also provided with an opening into which is threaded the pipe 32, which pipe may serve as an intake or inlet to introduce fluid under pressure into the valve body. The bottom of the valve body 11 is provided with an additional opening shown closed by plug 52. It will be apparent that the pipe 32 or a pipe connected to the opening closed by plug 52 will discharge directly into the body and that the fluid under pressure will be upon all sides of the valve disc 20 except the valve face 23, which is in contact with the valve seat 21 formed on the valve cover 12.

Referring now to Figures 5 and 6, the valve disc 20 is provided with passages 34 and 35 which are adapted to communicate with the passages 25 and 26 respectively, formed in the valve body. These passages 34 and 35 extend completely through the valve disc and therefore communicate with the fluid under pressure in the valve body. The valve disc 20 is also provided with the arcuate passage 36 which is closed on the bottom side of the valve disc throughout its extent, but is provided with the openings 37 and 38 on the upper face of the valve disc. These openings 37 and 38 are adapted selectively to be brought into communication with the exhaust passage 30 or with one of the passages 23 or 24.

The lower end of the valve stem 13 is provided with the laterally extending arm 39 which extends into a pocket 40 in the valve disc. This pocket 40 communicates with the central recess 19 in the valve disc and also is in communication with the upper face of the valve disc through the opening 41. The valve disc 20 is further provided with the stop lugs 42 and 43 which are adapted to engage the shoulders 44 and 45 to limit the rotary movement of the valve disc.

The lower end of the valve stem 13, as clearly shown in Figures 7 and 8, is loosely fitted within the valve disc and the arm 39 is also loosely fitted in the pocket 40. The valve stem 13 fits closely into the sleeve 46 formed on the valve cover. This close fit in the sleeve 46 causes the stem to rotate about a fixed axis. The valve disc, however, is not constrained except by its loose fit upon the valve stem 13 and arm 39. Consequently the valve disc does not have an exact rotary motion but a combined rotary and lateral motion. For example, when the valve disc is being rotated in the counterclockwise direction as shown in Figure 7, the disc is eccentric on the valve stem, the valve stem contacting the disc at the point 47. The arm 39 contacts the side of pocket 40 at point 48. When the rotation of the disc is reversed by a reverse movement of the handle 14 controlling the valve stem 13, three distinct movements take place. First, the valve stem rotates with no effect upon the disc, the angular extent of this movement depending upon the clearance of the end of the arm 39 in the pocket 40 in the disc. The second movement consists in a shifting of the disc to the right. This movement is approximately a straight line translation of that portion of the disc only which is closely adjacent to the point of contact 49 between the arm 39 and side of the pocket 40, as shown in Figure 8. As the disc shifts, all other portions thereof rotate about this point in a clockwise manner. This peculiar movement of the disc ceases when the wall of the stem hole in the disc contacts the cylindrical portion of the stem on the opposite side from the contact point for counterclockwise movement. This latter contact point has been indicated at 50.

In the operation of the valve, with the valve disc in normal position, as best shown in Figures 2 and 5, the fluid under pressure merely fills the cavity in the valve body and is not in communication with either cylinder or with the exhaust. When it is desired to operate the cylinder in one direction the valve disc is turned to the position shown in Figure 6. This is accomplished by counterclockwise movement of the valve stem 13 until the stop 43 engages the shoulder 45. This serves to bring the passage 34 into communication with the passage 25 leading through pipe 27 to one end of the cylinder. At the same time the opening 37 into passage 36 is brought into communication with the exhaust passage 30 and the opening 38 at the opposite end of passage 36 is brought into communication with the passage 26 leading to the opposite end of the cylinder. This permits fluid to be exhausted from the opposite end of the cylinder.

It will be understood that a complete reversal of the position of the valve disc made by moving the disc until the lug 42 engages the shoulder 44, will operate to connect the other end of the cylinder to the fluid under pressure and to connect the previous pressure end to the exhaust passage.

During the operation of the valve the pocket 40 formed in the valve disc, will have swept over a material portion of the valve face on the valve cover. This pocket is filled with lubricant which passes into the pocket from the valve stem. Consequently every operation of the valve serves to sweep a portion of the valve seat with lubricant. This lubricant works over the entire surface as the operation continues and the contacting surfaces are maintained fully lubricated.

It will be noted that none of the openings in the upper face of the valve disc exceeds in arcuate dimension the sweep of the valve disc in normal operation. Consequently a normal operation of the valve brings every portion of the valve seat into contact with some portion of the valve disc. This is highly important in that it keeps all parts of the surface lubricated and thus prevents any corrosion of parts. The eccentric movement or combined rotary and lateral movement which has been described in connection with Figures 7 and 8, is a very important factor in maintaining the surfaces lubricated and also in preventing the formation of any circular grooves or ridges due either to foreign matter or irregularities of the hardness of the valve or valve seat. This relative motion of the valve disc also serves to quickly eliminate any foreign matter which may get between the surfaces, as the lateral movement of the valve gradually works it over the edge of the valve instead of maintaining it between the surfaces as a straight rotary movement tends to do.

Another important result of the balanced location of the openings and the fact that the upper part of the intermediate portion of passage 36 is closed, lies in the equalized pressure areas between the valve disc and valve seat which causes an equal distribution of wear between the valve and seat.

It will be noted that the pipe connections to the valve are all made to the valve body so that the valve cover and valve disc may be removed for replacement or repair without breaking any pipe connections. The opening closed by plug 52 may be used to connect the intake pipe if that will simplify the piping at the particular point where the valve is used.

While the valve has been described as used in connection with the control of the flow of fluid to and from the opposite ends of a piston cylinder, it will be understood that it is capable of other uses. Any desired number of the ports or openings may be used or blanked off by plugs depending on the requirements of the particular use.

While we have shown one preferred embodiment of our invention, this is to be understood to be illustrative only as the construction is capable of modification to meet varying conditions and requirements and we contemplate such changes and variations as come within the spirit and scope of the appended claims.

We claim:

1. In a valve structure, a valve seat having a central opening, a valve member engaging the valve seat, said valve member having a central cavity formed therein, a valve operating member passing through the central opening in the valve seat and fitting loosely in the central cavity in the valve member, and an arm on the valve operating member adapted to engage the valve member at a point spaced from the central opening to impart a combined lateral and rotary movement to the valve member.

2. In a valve structure, a valve body having an axial opening therein, a rotatable valve operating member closely fitting the opening, a valve member engaging a valve seat in the valve body, said valve member having a central cavity formed therein, the valve operating member extending into the cavity and loosely fitted therein and an arm carried by the valve operating member engaging the valve member at a point spaced from the axis of rotation of the valve operating member to impart a combined lateral and rotary movement to the valve member.

3. In a valve structure, a valve body, a valve seat having a central opening, a valve member engaging the valve seat and loosely fitted in the valve body, a valve operating member passing through the central opening in the valve seat and closely fitting the opening in the valve seat for rotation therein, and an arm on the valve operating member adapted to engage the valve member at a point spaced from the central opening to impart a combined lateral and rotary movement to the valve member.

4. In a valve structure, a valve body, having an axial circular opening therein, a valve member fitted in the valve body for limited lateral and rotary movement therein, said valve member having a central pocket therein having a radially extending portion, a valve operating member extending through the central opening in the valve body and into the central pocket in the valve member, and an arm on the valve member extending into the radially extending portion of the pocket.

5. In a valve structure, a valve body having an axial circular opening therein, a valve member fitted in the valve body for limited lateral and rotary movement therein, said valve member having a central pocket therein having a radially extending portion, a valve operating member extending through the central opening in the valve body and into the central pocket in the valve member, and an arm on the valve operating member extending into the radially extending portion of the pocket, the valve operating member having a lubricant opening therethrough, the opening terminating in the central pocket in the valve member.

6. In a valve structure, a valve body having an axial circular opening therein, a valve member fitted in the valve body for limited lateral and rotary movement therein, said valve member having a central pocket therein having a radially extending portion, a valve operating member extending through the central opening in the valve body and into the central pocket in the valve member and loosely fitting therein, and an arm on the valve operating member extending into the radially extending portion of the pocket and loosely fitting therein.

7. In a valve structure, a valve body having a valve seat therein, a valve member, means for moving the valve member in contact with the valve seat, the valve member having a pocket therein opening upon the valve face adjacent the valve seat at a point spaced from the axis of the valve member, and means for supplying lubricant to said pocket.

8. In a valve structure, a valve body having a valve seat therein, a valve member, means for moving the valve member in contact with the valve seat, the valve member having a pocket therein opening upon the valve face adjacent the valve seat at a point spaced from the axis of the valve member, the valve moving means having a passage therein for supplying lubricant to said pocket.

9. In a valve structure, a valve body having a valve seat therein, a valve member engaging the seat, a valve actuator loosely engaging the valve member for imparting a combined rotary and lateral movement to the valve member, the valve member having a pocket therein communicating with the valve face in contact with the valve seat, and means for supplying lubricant to said pocket.

10. In a valve structure, a valve body having a valve seat therein, a valve member engaging the seat, and a valve actuator loosely engaging the valve member for imparting a combined rotary and lateral movement to the valve member, the valve member having a pocket therein communicating with the valve face in contact with the valve seat, the valve actuator having a passage therein communicating with the pocket for supplying lubricant thereto.

11. In a valve structure, a valve body having a valve seat therein, the valve seat having a plurality of openings therein and passages communicating with said openings, the valve body having a valve actuator receiving bore axially of said valve seat, a valve member engaging the valve seat, said valve member having a plurality of passages therein communicating with openings in the face engaging the valve seat, the valve member having a centrally located actuator receiving recess with a radially extending pocket, and a valve actuator fitting closely in the bore in the valve body, and loosely in the pocket in the valve member and having an arm extending into the radially extending pocket to impart a combined lateral and rotary movement to the valve member.

12. In a valve structure, a valve body having a valve seat therein, the valve seat having a plurality of openings therein and passages communicating with said openings, the valve body having a valve actuator receiving bore axially of said valve seat, a valve member engaging the valve seat, said valve member having a plurality of passages therein communicating with openings in the face engaging the valve seat, the valve member having a centrally located actuator receiving recess with a radially extending pocket, and a valve actuator fitting closely in the bore in the valve body and loosely in the pocket in the valve member and having an arm extending into the radially extending pocket, the arm fitting loosely in the pocket and having an enlarged end adapted to engage a lateral wall of the pocket at a point spaced from the central recess to impart a combined lateral and rotary movement to the valve member.

13. In a valve structure, a valve body having a valve seat therein, the valve seat having a plurality of openings therein and passages communicating with said openings, the valve body having a valve actuator receiving bore axially of said valve seat, a valve member engaging the valve seat, said valve member having a plurality of passages therein communicating with openings in the face engaging the valve seat, the valve member having a centrally located actuator receiving recess with a radially extending pocket, and a valve actuator fitting closely in the bore in the valve body and loosely in the pocket in the valve member and having an arm extending into the radially extending pocket to impart a combined lateral and rotary movement to the valve member, the radial pocket opening to the valve seat engaging face of the valve and the valve actuator having a passage formed therein to carry lubricant to the recess in the valve member.

14. In a valve structure, a valve body having a valve seat therein, the valve seat having a plurality of openings therein and passages communicating with said openings, the valve body having a valve actuator receiving bore axially of said valve seat, a valve member engaging the valve seat, said valve member having a plurality of passages therein communicating with openings in the face engaging the valve seat, the valve member having a centrally located actuator receiving recess with a radially extending pocket, a valve actuator fitting closely in the bore in the valve body and loosely in the pocket in the valve member and having an arm extending into the radially extending pocket, the radial pocket opening to the valve seat engaging face of the valve and the valve actuator having a passage formed therein to carry lubricant to the recess in the valve member, and means limiting movement of the valve member, said means preventing the radial pocket opening from being brought into registration with the openings in the valve body.

JOHN C. HANNA.
MATHER W. SHERWOOD.